(12) United States Patent
Takamura

(10) Patent No.: US 10,906,175 B2
(45) Date of Patent: Feb. 2, 2021

(54) APPARATUS AND METHOD FOR ESTIMATING POSITION OF THE CENTER OF GRAVITY OF ROBOT

(71) Applicant: DENSO WAVE INCORPORATED, Aichi-pref. (JP)

(72) Inventor: Noritaka Takamura, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 309 days.

(21) Appl. No.: 16/009,792

(22) Filed: Jun. 15, 2018

(65) Prior Publication Data

US 2018/0361580 A1 Dec. 20, 2018

(30) Foreign Application Priority Data

Jun. 15, 2017 (JP) .................................. 2017-117669

(51) Int. Cl.
*B25J 9/16* (2006.01)
*G05B 19/402* (2006.01)

(52) U.S. Cl.
CPC ........... *B25J 9/1607* (2013.01); *B25J 9/1638* (2013.01); *B25J 9/1694* (2013.01); *G05B 19/402* (2013.01); *G05B 2219/35124* (2013.01); *G05B 2219/40269* (2013.01)

(58) Field of Classification Search
CPC ...... B25J 9/1607; B25J 9/1638; B25J 9/1694; B25J 9/1602; B25J 13/088; G05B 19/402; G05B 2219/40269; G05B 2219/35124
See application file for complete search history.

(56) References Cited

U.S. PATENT DOCUMENTS

| | | | | |
|---|---|---|---|---|
| 4,819,184 A | * | 4/1989 | Jonsson | G05B 19/373 700/250 |
| 7,713,217 B2 | * | 5/2010 | Ikeuchi | A61H 3/00 600/595 |
| 9,399,293 B2 | | 7/2016 | Shin | |
| 2006/0247800 A1 | * | 11/2006 | Takenaka | B62D 57/032 700/54 |
| 2012/0310412 A1 | * | 12/2012 | Seo | B25J 9/0006 700/254 |

(Continued)

FOREIGN PATENT DOCUMENTS

| | | |
|---|---|---|
| JP | 2013-195198 A | 9/2013 |
| JP | 5327722 B2 | 10/2013 |

*Primary Examiner* — Mohammad K Islam
(74) *Attorney, Agent, or Firm* — Oliff PLC

(57) ABSTRACT

A position of gravity of center of a load loaded to an industrial load is estimated. The robot has a robot arm driven horizontally. The robot arm includes first to fourth axis. Acceleration generated at the second axis during accelerated and decelerated intervals of each of three operation periods. In each operation period, the second axis is driven to move the robot arm from one initial position to one first estimating position and returns it from the estimating position to the initial position. During each operation period, the load is given a known mass, the fourth axis is positioned at a preset angle, and the first, third and fourth axes are the same in positions between the initial and estimating positions. The fourth-axis position is changed to different angles for every operation period. Based on calculated acceleration and known factors of the robot and load, the position is estimated.

13 Claims, 7 Drawing Sheets

(56) References Cited

U.S. PATENT DOCUMENTS

| | | | |
|---|---|---|---|
| 2014/0114479 A1* | 4/2014 | Okazaki | B25J 9/1651 |
| | | | 700/253 |
| 2014/0238157 A1 | 8/2014 | Sato | |
| 2014/0297030 A1* | 10/2014 | Iwasaki | B25J 9/1651 |
| | | | 700/245 |
| 2014/0316572 A1 | 10/2014 | Iwatake | |
| 2014/0316573 A1 | 10/2014 | Iwatake | |
| 2015/0258685 A1* | 9/2015 | Matsumoto | B25J 9/1642 |
| | | | 700/261 |
| 2015/0290798 A1* | 10/2015 | Iwatake | B25J 9/0081 |
| | | | 700/257 |
| 2016/0327934 A1 | 11/2016 | Morimoto | |
| 2017/0015004 A1* | 1/2017 | Osaka | B25J 13/089 |
| 2017/0181917 A1* | 6/2017 | Ohta | A61H 1/0244 |
| 2018/0267501 A1* | 9/2018 | Yamada | G05B 19/404 |
| 2019/0275674 A1* | 9/2019 | Yamamoto | B25J 13/00 |

* cited by examiner

| L | LINK LENGTH | $l_h$ | DISTANCE TO GRAVITY CENTER |
| --- | --- | --- | --- |
| $\theta$ | AXIAL ANGLE | $\theta_h$ | DIRECTION OF GRAVITY CENTER |
| $\omega$ | ANGULAR ACCELERATION | $X_{cog}$ | GRAVITY CENTER POSITION (IN x-DIRECTION) |
| m | MASS | $Y_{cog}$ | GRAVITY CENTER POSITION (IN y-DIRECTION) |
| | | $I_{z4}$ | INERTIA AROUND THE FOURTH AXIS |

APPARATUS AND METHOD FOR ESTIMATING POSITION OF THE CENTER OF GRAVITY OF ROBOT

CROSS-REFERENCE TO RELATED APPLICATION

This application is based on and claims the benefit of priorities from earlier Japanese Patent Application No. 2017-117669 filed Jun. 15, 2017, the description of which is incorporated herein by reference.

BACKGROUND

Technical Field

The present invention relates to an apparatus and method for estimating the position of the center of gravity of a load amounted on the arm end of a robot, and in particular, to the apparatus and method which can preferably applied to an industrial robot of a horizontal 4-axis configuration.

Related Art

There is known a conventional technique for estimating the position of the center of gravity of a workpiece held as a load by the end of an arm of a vertical 6-axis robot arm. This technique is for example proposed by Japanese Patent No. 5327722.

In the configuration of the vertical 6-axis robot arm, the fifth axis can be activated to change a state where a force of gravity acts on a workpiece. It is thus possible to estimate the position of center of gravity of the workpiece. This foregoing estimation technique proposed by Japanese Patent No. 5327722 is based on the use of such a changing technique using the fifth axis, but this estimation technique cannot be used in robots which are horizontal 4-axis configuration robots, due to the fact that the state where a force of gravity acts on a workpiece cannot be changed.

SUMMARY

In view of this drawback, it is thus desired to provide a method and apparatus which can estimate the position of the center of gravity of a load mounted on the tip of an arm of a horizontal 4-axis configuration robot.

As an exemplary embodiment according to the disclosure, there is provided an apparatus for estimating a position of gravity of center of a load loaded to a robot, the robot being provided with a robot arm driven horizontally, the robot arm including four axes configured as first to fourth axis and having an end to which the load is loaded. The apparatus is provided with a first acceleration acquiring unit configured to acquire acceleration generated at the second axis during accelerated and decelerated intervals of a first operation period in which the second axis is driven such that the robot arm moves from a first initial position to a first estimating position and returns from the first estimating position to the first initial position, wherein during the first operation period, the load is given a known mass, the fourth axis is positioned at a first angle $\theta_a$, and the first, third and fourth axes are the same in positions between the first initial and estimating positions; a first torque accruing unit configured to acquire acceleration torque generated at the fourth axis during the accelerated interval and deceleration torque generated at the fourth axis during the decelerated interval; a first inertia calculating unit configured to calculate inertia $\tau_{I4a}$ generated around the fourth axis based on the acceleration in both the accelerated and decelerated intervals, the acceleration torque and the decelerated torque; a second acceleration acquiring unit configured to acquire acceleration generated at the second axis during accelerated and decelerated intervals of a second operation period in which the second axis is again driven such that the robot arm moves from a second initial position to a second estimating position and returns from the second estimating position to the second initial position, wherein during the second operation period, the load is given the same known mass, the fourth axis is positioned at a second angle $\theta_b$ ($\neq \theta_a$), and the first, third and fourth axes are the same in positions between the second initial and estimating positions; a second torque accruing unit configured to acquire acceleration torque generated at the fourth axis during the accelerated interval and deceleration torque generated at the fourth axis during the decelerated interval in the second operation period; a second inertia calculating unit configured to calculate inertia $i_{4b}$ generated around the fourth axis based on the acceleration in both the accelerated and decelerated intervals, the acceleration torque and the decelerated torque in the second operation period;

a third acceleration acquiring unit configured to acquire acceleration generated at the second axis during accelerated and decelerated intervals of a third operation period in which the second axis is again driven such that the robot arm moves from a third initial position to a third estimating position and returns from the third estimating position to the third initial position, wherein during the third operation period, the load is given the same known mass, the fourth axis is positioned at a third angle $\theta_c$ ($\neq \theta_a$, $\theta_b$), and the first, third and fourth axes are the same in positions between the third initial and estimating positions; a third torque accruing unit configured to acquire acceleration torque generated at the fourth axis during the accelerated interval and deceleration torque generated at the fourth axis during the decelerated interval in the third operation period; a third inertia calculating unit configured to calculate inertia $\tau_{I4c}$ generated around the fourth axis based on the acceleration in both the accelerated and decelerated intervals, the acceleration torque and the decelerated torque in the third operation period; and a center of gravity calculating unit configured to calculate a position of a center of gravity of the load on a plane perpendicular to the height direction of a base included in the robot arm, based on i) amounts of the calculated inertia $\tau_{I4a}$, $\tau_{I4b}$ and $\tau_{I4c}$, which are acquired under the mutually-different first to third angles $\theta_c$, $\theta_a$, and $\theta_b$ of the fourth axis, and ii) the mass m of the load.

Accordingly, even in the horizontal four-axis industrial robot, it is possible to estimate, through easier estimating operations, a position of a center of gravity of a load loaded to the robot in an end-effector coordinate plane. Hence, this position information can be reflected in controlling the robot arm, whereby the arm control can be performed in a more reliable and precise manner even if loads being loaded to the robot have indefinite shapes or irregular densities.

It is preferred that, in the foregoing configuration, the first to third acceleration acquiring units sets, as the first to third angles $\theta_c$, $\theta_a$, and $\theta_b$ of the fourth axis, 0 degrees, 90 degrees, and −90 degrees in a coordinate set for an end effector holding the load. This configuration thus results in a simple and easier acceleration acquisition, while an amount of calculation, which is performed by a controller or a calculator, is reduced.

It is also preferred that the robot has a base at one end the first axis is provided, a base coordinate being set to the base and having a Z-axis direction along a height direction; the third axis is provided to link second and third arms composing part of the robot arm; and each of the first to third acceleration acquiring units is configured to calculate the acceleration and deceleration with the third axis in a state where the third axis is driven to an uppermost position in the height direction. By this configuration, vibration or shaking motions of a third link through which the third axis is realized can be prevented from being transmitted to the load which is now subject to the estimation, thereby making it possible to positionally estimate the center of gravity in a more reliable manner.

As another exemplary embodiment according to the disclosure, there is provided a method of estimating a position of gravity of center of a load loaded to a robot, which has similar features described above.

DETAILED DESCRIPTION OF THE PREFERRED EMBODIMENTS

Hereinafter, with reference to FIGS. 1 to 10, a preferred embodiment will now be described according to an apparatus and method for estimating the position of the center of gravity of a load amounted on the arm end of an industrial robot.

Figure 9:
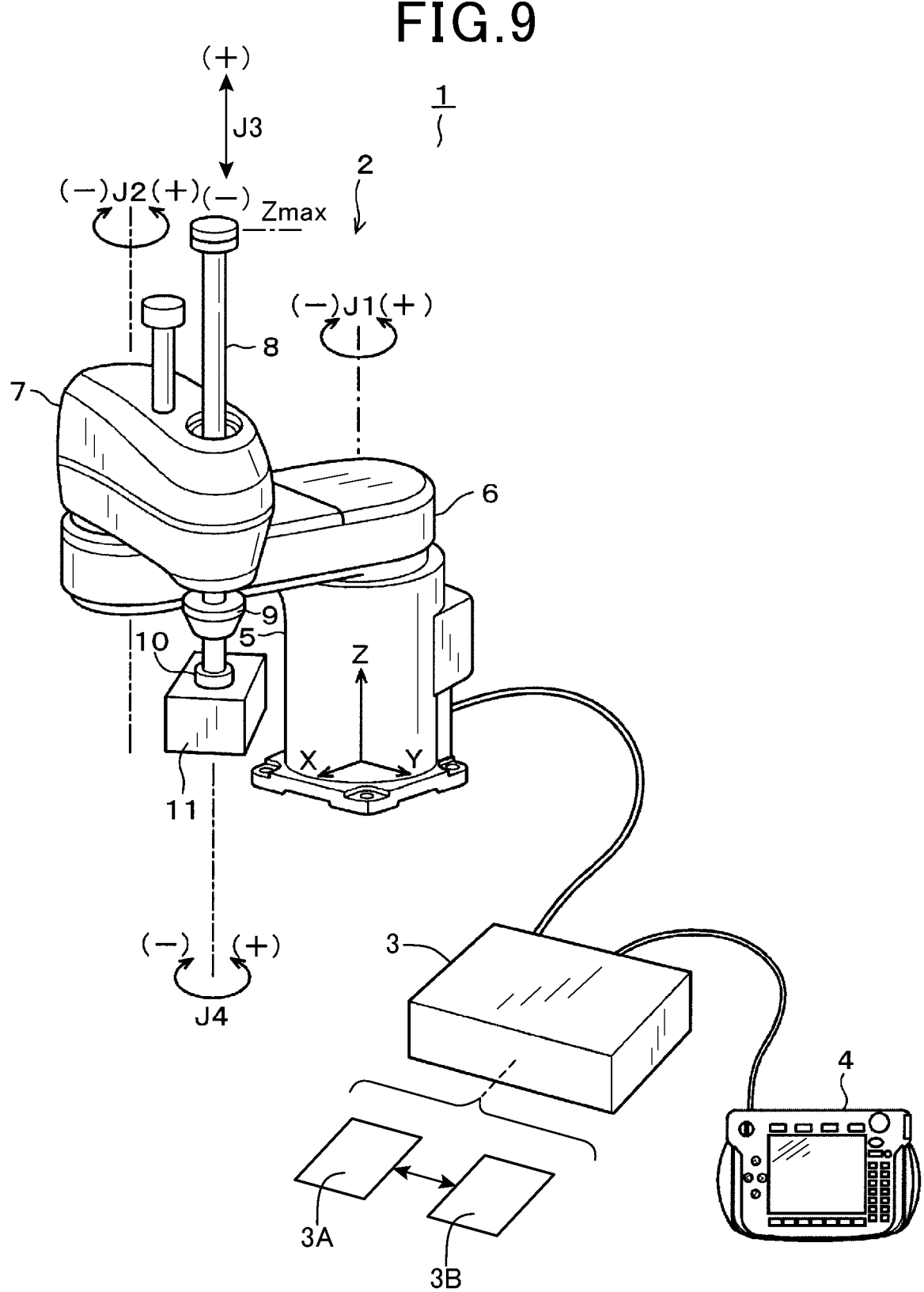
FIG. 9 is a perspective diagram schematically showing an industrial robot system.

First of all, by using FIG. 9, a whole system will be described. FIG. 9 shows a system configuration of one of ordinarily used industrial robots, in which a robot system 1 is provided. This robot system 1 is provided with an industrial robot 2, a controller 3 which controls motions of the robot 2, and a teaching pendant 4 communicably connected to the controller 3. The controller 3 can serve as a control apparatus and an estimation apparatus for estimating a center of gravity of a load attached to the robot 2.

The robot 2 is configured, for example, as a 4-axis horizontal multi-articulated robot, and is equipped with a base 5 fixedly mounted on an installation surface of, for example, a floor, a first arm 6 rotatably built on the base 5, a second arm 7 coupled with the first arm 6, and a shaft 8 linked with the second arm 7. To the base 5, as shown in FIG. 9, a three-dimensional base coordinate XTZ is set, in which the Z-axis direction is along the height direction of the robot 2.

Specifically, one longitudinal end portion of the first arm 6 is rotatably coupled with the base 5 via a first axis J1 which enables the first arm 6 to be rotated. The first axis J1 has a shaft center directed along the Z-axis direction which is set to be a vertical axis to the base 5. One longitudinal end portion of the second arm 7 is also rotatably coupled with the other longitudinal end portion of the first arm 6 via a second axis J2 which enables the second arm 7 to be rotated therearound relatively to the first arm 6. The second axis J2 also has a shaft center directed along the Z-axis direction. The shaft 8 is rotatably and vertical-movably arranged through the remaining longitudinal end portion of the second arm 7. A third axis J3 is arranged to move the shaft 8 up and down in the Z-axis direction, while a fourth axis J4 is arranged to enable rotation of the shaft 8. To a lower end portion of the shaft 8, a flange (or an end effector) 9 is detachably attached to the shaft 8 in a positionally adjusted manner.

A two-dimensional end-effector coordinate (or referred to as a flange coordinate) xy is set to the flange 9.

The base 5, the first arm 6, the second arm 7, the shaft 8 and the flange 9 serves, as a whole, as a robot arm of the robot 2, so that the flange 9 serves as a robot arm end portion. Hence, a tool, or a workpiece, can be attached to the flange 9. Such a tool is an air chuck 10. In the explanation shown in FIG. 7, the air chuck 10 is employed to suck a workpiece 11 which is a load to the robot. In effect, the workpiece 11 has an indefinite shape and its density is locally irregular, which needs to check the position of the center of gravity in the end-effector coordinate xy in order to raise control precision in controlling robot arm operations.

The respective axes J1 to J4 provided in the robot 2 are actually provided by central axes of the shafts of electric motors (not shown), which are arranged respectively to the axes J1 to J4. Closely to each of the motors, a sensor to detect both a rotation angle and a rotation speed is arranged, although not shown.

In general, industrial robots are driven according to predetermined operation programs made via a teaching conducted previously. The controller 3 complies with the operation programs to feedback control drive of each of the motors and control motions of the arms of the robot 2.

Hence, although not shown, the controller 3 is provided as a computer configuration provided with a processor (such as CPU) 3A performing control actions of the robot 2, a storage device (such as ROM) 3B, and other necessary components such as RAM (not shown). In the present embodiment, the storage device 3B, which serves as a non-transitory computer readable recording medium, is composed of, for example, semiconductor memory elements. When being activated, the processor 3A reads various programs from the storage device 3B, into which such programs are implemented beforehand, and executes steps defined in such programs, thereby functionally realizing the functions set forth in the present disclosure.

The teaching pendant 4 is formed into a size which allows a user to hold it by hand or bring it with the user, so that the teaching pendant 4 is formed into a flat, substantially rectangular plate shape. There are arranged key switches on the teaching pendant 4, for various user's input operations at the teaching pendant 4. The teaching pendant 4 is communicably connected to the controller 3 via a cable, and provided with a communication interface to establish fast data transfer to and from the controller 3. Various types of information signals, such as operation signals given by user's key switch operations, can thus be sent from the teaching pendant 4 to the controller 3.

How to estimate the position of the center of gravity of the workpiece 11 which including the tool will now be detained theoretically.

Figure 10:
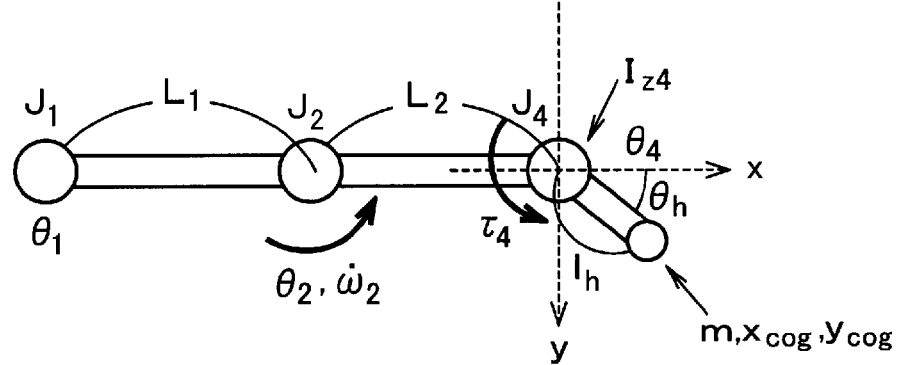
FIG. 10 is an illustration showing the 4-axis arm model.

FIG. 10 shows a 4-axis arm model of the foregoing robot 2. In the present embodiment, the position of the center of gravity is estimated based on acceleration acting on the fourth axis, in response to having the second axis of the arms moved. Here it is assumed that the mass m of the workpiece 11 including the tool is known.

When the robot 2 is activated, an amount of toque $\tau_M$ applied to each of the electric motors can be expressed by the following formula (1):

$$\tau_M = \frac{(\tau_I + \tau_f + \tau_G + Frc)}{\text{Gear}}(M_I\dot{\omega} + M_{vis}\omega)\text{Gear} + M_{Frc}, \quad (1)$$

wherein $\tau_I$: inertia toque, $M_I$: inertia of motor, $\tau_f$: centrifugal toque, $M_{vis}$: viscosity of motor, $G_{ear}$: gear ratio, $\tau_G$: gravity torque, $M_{Frc}$: friction of motor, $\omega$: angular velocity of motor, $F_{rc}$: friction torque, $\omega(dot):=d\omega/dt$: angular acceleration of motor.

In the following, the angular acceleration may be referred to simply as "acceleration".

Figure 2:
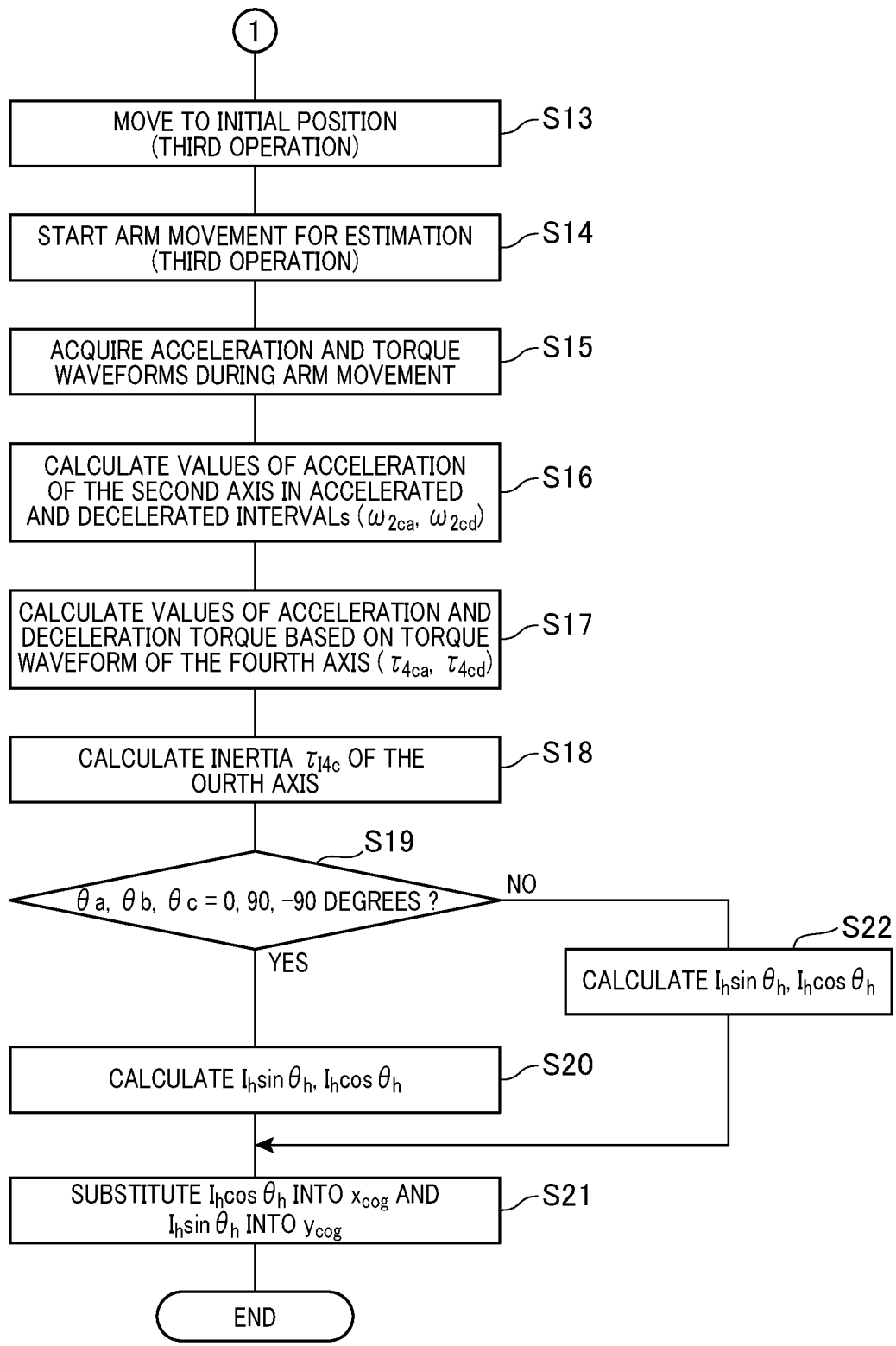
FIG. 2 is a flowchart showing the remaining part of the process explaining how to estimate the position of the center of gravity of the workpiece.

When the motor is driven based on an angular velocity pattern shown in FIG. 2, torque acting on the motor during an accelerated interval and a decelerated interval is referred as $\tau_{Macc}$ and $\tau_{Mdec}$, and a difference between the torque amounts $t_{Macc}$ and $\tau_{Mdec}$ is calculated. By this difference calculation, terms depending on $\tau_f$, $F_{rc}$, $M_{vis}$, and $M_{Frc}$ are removed, so that terms $\tau_I$ and $M_I$ depending on the acceleration remain, as shown in the formula (2):

$$\tau_{Macc} - \tau_{Mdec} = \frac{\tau_{Iacc} - \tau_{Idec}}{\text{Gear}} + M_I(\dot{\omega}_{acc} - \dot{\omega}_{dec})\text{Gear} \quad (2)$$

When the second axis is driven but the fourth axis is not driven, angular acceleration of the fourth axis becomes zero. Hence, inertia torque $\tau_{I4}$ of the second axis can be expressed by the formula (3).

$$\tau I_4 = \frac{\tau_{M4acc} - \tau_{M4dec}}{(\dot{\omega}_{acc} - \dot{\omega}_{dec})\text{Gear}} = ml_h L_2 \cos(\theta_4 + \theta_h) + I_{z4} \quad (3)$$

In a case where the angle of the fourth axis is set to each of mutually-different angles $\theta_a$, $\theta_b$, and $\theta_c$ and in this each setting state, the robot arm is driven in the same motion, differences between inertia $I_a$, $I_b$, and $I_c$ of the fourth axis can be expressed by the formulas (4) and (5), such that:

$$I_a - I_b = ml_h L_2\{\cos(\theta_a + \theta_h) - \cos(\theta_b + \theta_h)\} \quad (4)$$
$$= ml_h L_2\{(\cos\theta_a - \cos\theta_b)\cos\theta_h - (\sin\theta_a - \sin\theta_b)\sin\theta_h\}$$

$$I_a - I_c = ml_h L_2\{(\cos\theta_a - \cos\theta_c)\cos\theta_h - (\sin\theta_a - \sin\theta_c)\sin\theta_h\} \quad (5)$$

The positional coordinate $x_{cog}$, $y_{cog}$ of the center of gravity of the workpiece 11, which are desired, is expressed by the formula (6), such that:

$$x_{cog} = l_h \cdot \cos\theta_h$$
$$y_{cog} = l_h \cdot \sin\theta_h \quad (6)$$

Using the formulas (4) and (5), this formula (6) can be developed into the following formulas (7) and (8).

$$l_h \sin\theta_h = \frac{(\cos\theta_a - \cos\theta_c)(I_a - I_b) - (\cos\theta_a - \cos\theta_b)(I_a - I_c)}{\{(\cos\theta_a - \cos\theta_b)(\sin\theta_a - \sin\theta_c) - (\sin\theta_a - \sin\theta_b)(\cos\theta_a - \cos\theta_c)\}m} = y_{cog} \quad (7)$$

$$l_h \cos\theta_h = \frac{(\sin\theta_a - \sin\theta_c)(I_a - I_b) - (\sin\theta_a - \sin\theta_b)(I_a - I_c)}{\{(\cos\theta_a - \cos\theta_b)(\sin\theta_a - \sin\theta_c) - (\sin\theta_a - \sin\theta_b)(\cos\theta_a - \cos\theta_c)\}m} = x_{cog} \quad (8)$$

When $\theta_a=0$, $\theta_b=\pi/2$, and $\theta_c=-\pi/2$ are substituted into the formulas (7) and (8), these formulas (7) and (8) can be simplified as follows:

$$l_h \sin\theta_h = \frac{I_c - I_b}{m} = y_{cog} \quad (9)$$

$$l_h \cos\theta_h = \frac{2I_a - I_b - I_c}{m} = x_{cog} \quad (10)$$

With reference to FIGS. 1-8, operations of the system according to the present embodiment, which is based on the foregoing theoretical principal, will now be described.

Figure 1:
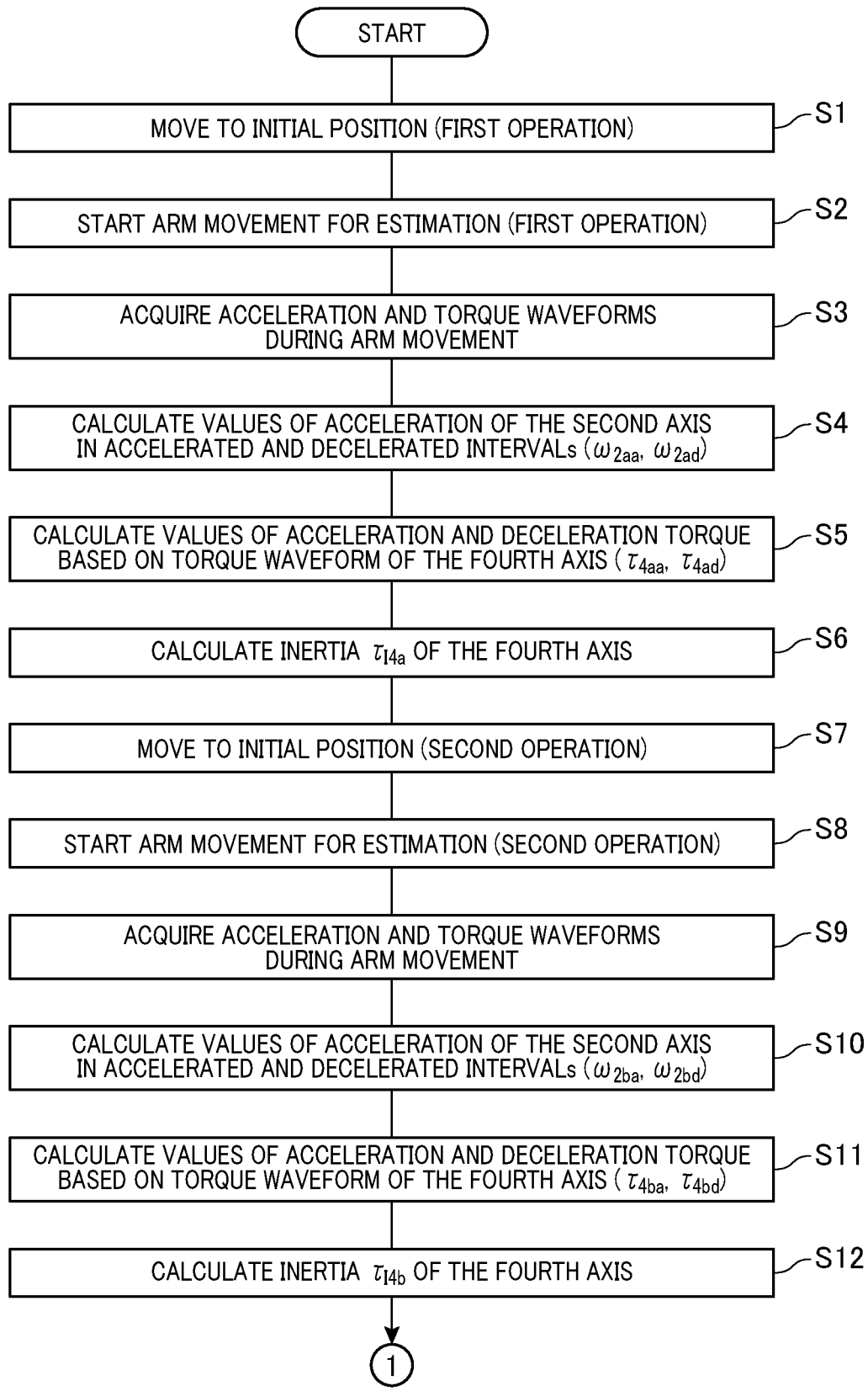
FIG. 1 is a flowchart showing part of the process explaining how to estimate the position of the center of gravity on a workpiece mounted on the end of a horizontal 4-axis configuration robot, according to an embodiment.

FIGS. 1 and 2 show flowcharts for a process used for estimating the position of the center of gravity. This process is executed by the controller 3.

Figure 3:
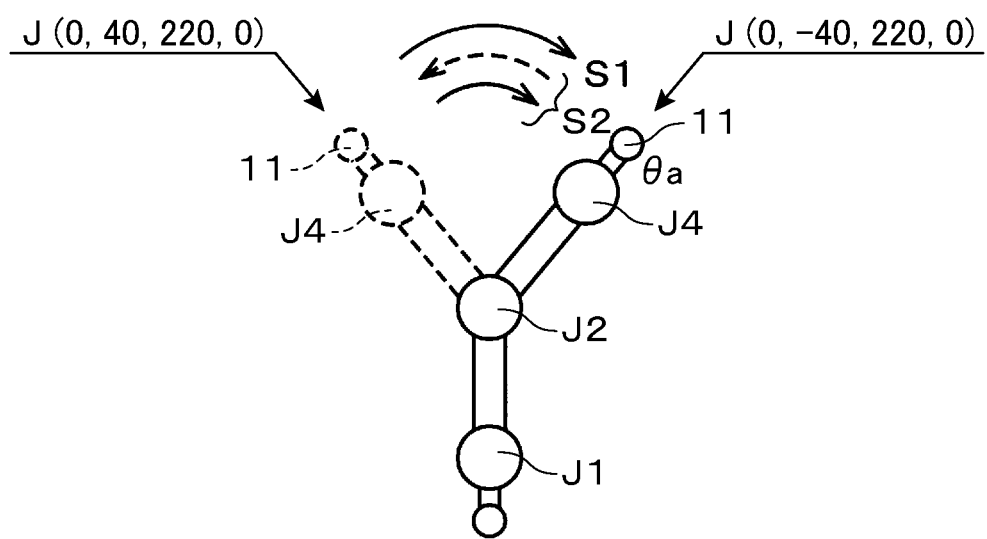
FIG. 3 is an illustration explaining how the arm behaves during the first motion period, by using a 4-axis arm model.
Figure 4:
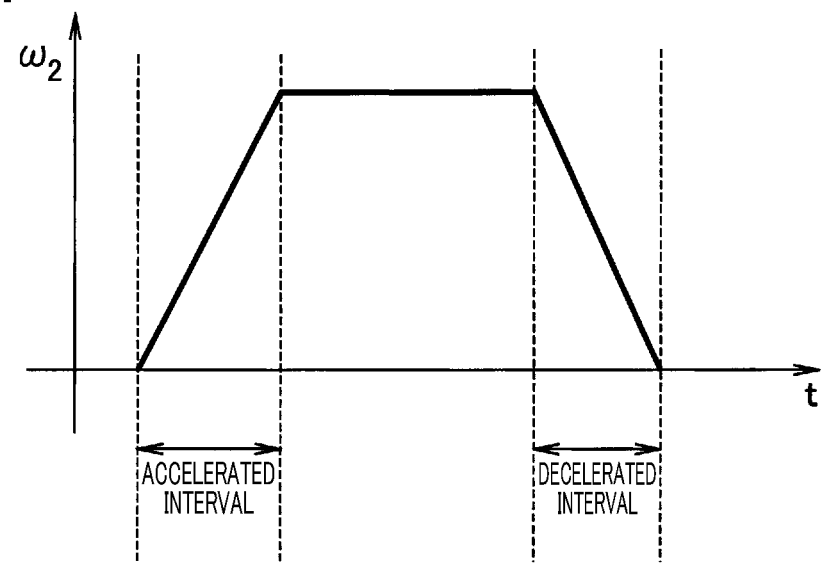
FIG. 4 is a graph showing a velocity waveform of the second axis.
Figure 5:
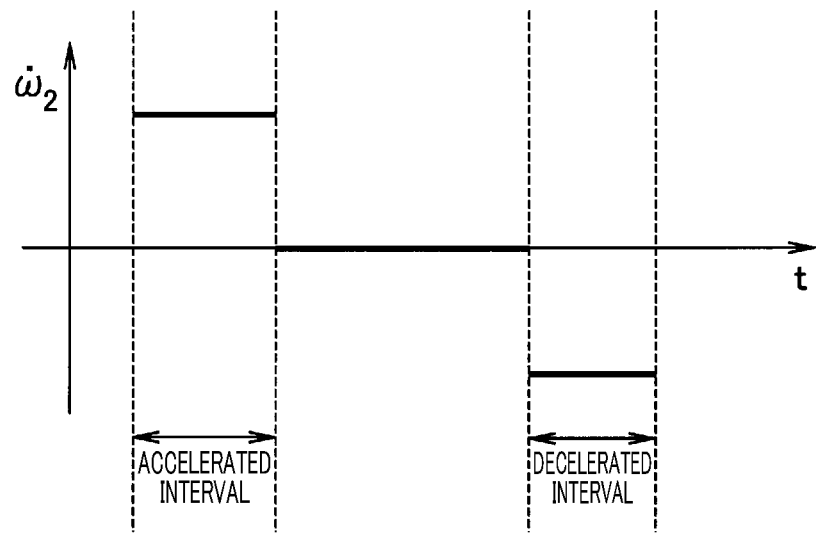
FIG. 5 is a graph showing an acceleration waveform of the second axis.
Figure 6:
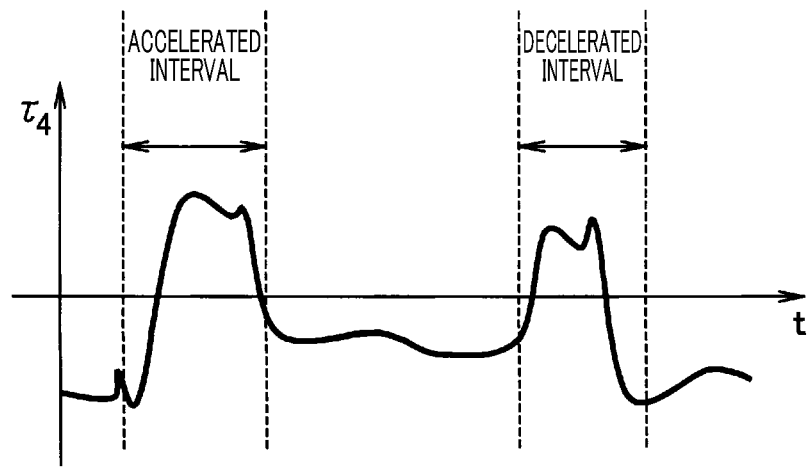
FIG. 6 is a graph showing a torque waveform at the fourth axis.

First, the arm of the robot 2 is driven to move to a first intimal position (step S1). By way of example, as shown in FIG. 3, this first initial position is set to (J1,J2,J3,J4)=J(0,−40,220,0), in which the values "0, −40, 220, 0" are expressed as "θ values" (hereinafter the same expression as this is employed) and "J3=220" shows that the third axis is moved to its uppermost end position, i.e., the uppermost allowable limit position Zmax (refer to FIG. 9) in the height Z-axis direction, which attitude provides Oa to the fourth axis.

The arm is then driven to start a first operation such that the arm is driven to take its first estimating position, and driven to return to the first initial position (step S2). For example, the first estimating position is given as:

J(0,40,220,0).

In this state, the fourth axis is kept at its initial position, that is, J4=θ_a=0.

Then, the processing proceeds to step S3 where an acceleration waveform at the second axis and a torque waveform at the fourth axis are subjected to their sampling operations during a first operation period defined by a period of time necessary for the arm to arrive at the first estimating position (an operation (1)) and a period of time necessary for the arm to return to the first initial position from the first estimating position (an operation (2)). Such waveforms are exemplified as in FIGS. 4 and 5. Averaging the waveforms in the operations (1) and (2) during the first operation period makes it possible to provide a waveform with the friction force factor removed.

Then, based on the obtained acceleration waveform, acceleration at the second axis in the accelerated and decelerated intervals, which are referred as ω(dot)$_{2aa}$ and ω(dot)$_{2ad}$, are acquired by reverse-conversion of the acquired wave forms (step S4). The process at step S4 functionally corresponds to a first acceleration acquiring unit. Furthermore, based on the obtained torque waveform, acceleration torque of the fourth axis in the accelerated and decelerated intervals, which are referred as τ$_{4aa}$ and τ$_{4ad}$, are acquired (step S5). The process at step S5 functionally corresponds to a first torque acquiring unit. The acceleration values at the second axis and the torque values at the fourth axis, which have been acquired at steps S4 and S5, are substituted into a formula (11) to calculate inertia, τ$_{I4a}$, at the fourth axis (step S6).

$$\tau I_{4a} = \frac{\tau_{4aa} - \tau_{4ad}}{(\dot{\omega}_{2aa} - \dot{\omega}_{2ad})\text{Gear}} \quad (11)$$

The arm is then driven to move to a second initial position (step S7). This second initial position is set as a position defined by moving only the fourth-axis position from θ$_a$ to θ$_b$=90 degrees at the first initial position, that is, the second initial position is, for instance,

J(0,−40,220,90).

Figure 7:
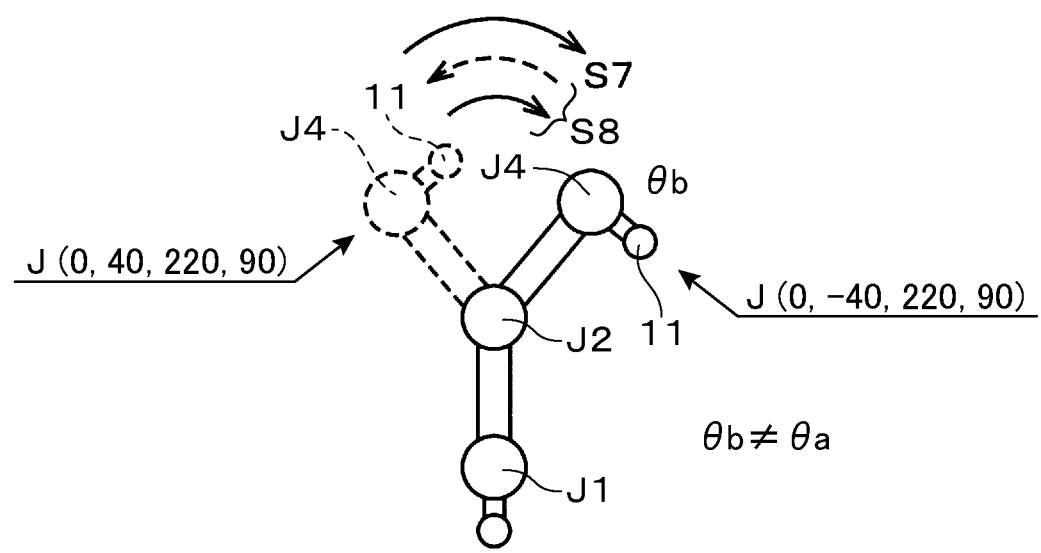
FIG. 7 is an explanation explaining how the arm behaves during the second motion period, by using the 4-axis arm model.

The arm is further driven to perform a second operation (step S8). As shown in FIG. 7, a second estimating position is set as a position defined by moving only the fourth-axis position to θ$_b$=90 degrees at the first estimating position, which is

J(0,40,220,90).

Equivalently to the first operation period, a second operation period is defined as a duration necessary to move the arm from the second estimating position to the second initial position.

Steps S9 to S12 follows subsequently, which are processed in the same way as the foregoing steps S3 to S6, but directed to the second operation period. Hence, the process at step S10 provides values of acceleration of the second axis, ω(dot)$_{2ba}$ and ω(dot)$_{2bd}$, and the process at step S11 provides values of torque of the fourth axis, τ$_{4ba}$ and τ$_{4bd}$. The step S10 functionally realizes a second acceleration acquiring unit, while the step S11 functionally realizes a second torque acquiring unit. By substituting the value of acceleration of the second axis acquired at step S10 and the value of torque of the fourth axis acquired at step S11 into the following formula (12) to calculate inertia of the fourth axis, τ$_{I4b}$ (step S12):

$$\tau I_{4b} = \frac{\tau_{4ba} - \tau_{4bd}}{(\dot{\omega}_{2ba} - \dot{\omega}_{2bd})\text{Gear}} \quad (12)$$

The arm is again driven to move to a third initial position (step S13). This third initial position is set as a position defined by moving only the fourth-axis position from θ$_a$ to θ$_c$=−90 degrees at the first initial position, that is, the third initial position is, for instance,

J(0,−40,220,−90).

Figure 8:
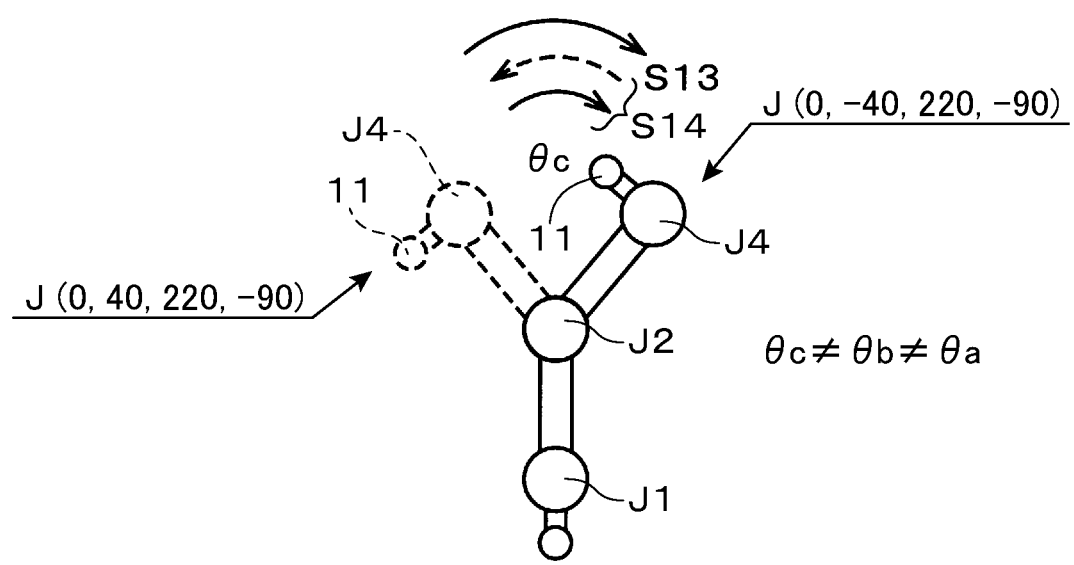
FIG. 8 is an illustration explaining how the arm behaves during the third motion period, by using the 4-axis arm model.

The arm is further driven to perform a third operation (step S14). As shown in FIG. 8, a third estimating position is set as a position defined by moving only the fourth-axis position to θ$_c$=−90 degrees at the first estimating position, which is

J(0,40,220,−90).

Equivalently to the first operation period, a third operation period is defined as a duration necessary to move the arm from the third estimating position to the third initial position.

Steps S15 to S18 follows subsequently, which are processed in the same way as the foregoing steps S3 to S6, but directed to the third operation period. Hence, the process at step S16 provides values of acceleration of the second axis, ω(dot)$_{2ca}$ and ω(dot)$_{2cd}$, and the process at step S17 provides values of torque of the fourth axis, τ$_{4ca}$ and τ$_{4cd}$. The step S16 functionally realizes a third acceleration acquiring unit, while the step S17 functionally realizes a third torque acquiring unit. By substituting the value of acceleration of the second axis acquired at step S16 and the value of torque of the fourth axis acquired at step S17 into the following formula (13) to calculate inertia of the fourth axis, τ$_{I4c}$ (step S18):

$$\tau I_{4c} = \frac{\tau_{4ca} - \tau_{4cd}}{(\dot{\omega}_{2ca} - \dot{\omega}_{2cd})\text{Gear}} \quad (13)$$

In the present embodiment, when the angles θ$_a$, θ$_b$ and θ$_c$ of the fourth axis are selected as 0 degrees, 90 degrees, and −90 degrees respectively, the determining process at step S19 is YES. In this case, the processing proceeds to step S20, at which the foregoing formulas (9) and (10) are used to calculate I$_h$ cos θ$_h$ and I$_h$ sin θ$_h$. It is thus possible to perform the process at step S21, at which the formula (6) is used to calculate the position (x$_{cog}$, y$_{cog}$) of center of gravity of the workpiece 11.

Meanwhile, in contrast to the above, when the angles θ$_a$, θ$_b$ and θ$_c$ of the fourth axis are selected as 0 degrees, 90 degrees, and −90 degrees respectively, the determining process at step S19 becomes NO. In this case, the foregoing formulas (7) and (8) are used to calculate I$_h$ cos θ$_h$ and I$_h$ sin θ$_h$ (step S22). Furthermore, in the same manner as the above, the formula (6) is used to calculate the position of the center of gravity, (x$_{cog}$, y$_{cog}$) of the workpiece 11 in the end-effector coordinate xy (step S22). In using the formulas (9) and (10), or, (7) and (8), the amounts of the fourth-axis inertia Ia, Ib, and Ic are replaced by the mounts of fourth-axis inertia τ$_{I4a}$, τ$_{I4b}$, and τ$_{I4c}$, respectively, calculated by the formulas (11), (12) and (13).

Hence, the steps S19 to S22 functionally realize a gravity-center position calculating unit.

If there is an error between the actual position of center of gravity of the workpiece 11 and the position of center of gravity, (x$_{cog}$, y$_{cog}$), actually calculated in the present embodiment, correction coefficients depending on an amount of the error can be used for correcting the position.

As described in the present embodiment, in a state where the arm of the horizontal four-axis robot 2 has a known workpiece 11 (its mass m) attached to the end of the robot 2, the controller 3 drives the arm to acquire the acceleration of the second axis in each of the accelerated and decelerated intervals for the first operation period. The first operation period is defined as a period necessary for movement from the first initial position at which the fourth-axis position is θ$_a$, to the first estimating position realized by moving the second axis, and a period necessary for return from the first estimating position to the first initial position.

The controller 3 then acquires acceleration torque of the fourth axis in the accelerated interval and deceleration torque of the fourth axis in the decelerated interval, and calculates inertia τI4a around the fourth axis based on the acceleration in each of the accelerated and decelerated intervals, the acceleration torque, and the deceleration torque.

In addition, the controller 3 performs the second operation to acquire the acceleration of the second axis in each of the accelerated and decelerated intervals in the second operation period. The second operation enables the second axis to be operated from the second initial position realized by changing the fourth-axis position to $\theta_b$ at the first initial position. As to the second operation period, by the controller 3, amounts of the acceleration and deceleration torque of the fourth axis are acquired, and an amount of the inertial $\tau_{I4b}$ around the fourth axis is calculated, in the same manner as obtaining the first torque.

The controller 3 further performs the third operation to acquire the acceleration of the second axis in each of the accelerated and decelerated intervals in the third operation period. The third operation enables the second axis to be operated from the third initial position realized by changing the fourth-axis position to $\theta_c$ at the first initial position. As to the third operation period, by the controller 3, amounts of the acceleration and deceleration torque of the fourth axis are acquired, and an amount of the inertia $\tau_{I4c}$ around the fourth axis is calculated. Then, by the controller 3, based on the foregoing known and calculated amounts of $I_h$, $\theta_h$, $\tau_{I4a}$, $\tau_{I4b}$, $\tau_{I4c}$, $\theta_a$, $\theta_b$, and $\theta_c$, the position of center of gravity $(x_{cog}, y_{cog})$ of the workpiece 11 is calculated.

In other words, the fourth axis of the arm provided with the load is moved to each of the three different fourth-axis positions, whereby the load is moved horizontally in the same manner, which causes acceleration at the fourth axis (i.e., physically, the fourth link). Based on the acceleration applied to the fourth axis at each of the three different fourth-axis positions, amounts of inertia $\tau_{I4a}$, $\tau_{I4b}$ and $\tau_{I4c}$ are calculated. These inertia amounts $\tau_{I4a}$, $\tau_{I4b}$ and $\tau_{I4c}$ and the fourth-axis positions $\theta_a$, $\theta_b$, and $\theta_c$ are then subjected to acquisition of the position of center of gravity, i.e., the gravity center position, $(x_{cog}, y_{cog})$, of the workpiece 11. It is thus possible to estimate the gravity center position of the workpiece 11 in the horizontal plane (i.e., the end-effector coordinate xy) in a robot provided with an arm configuration including the four axes (i.e., four joints). Accordingly, even in the four-axis horizontal multi-joint robot, the center of gravity of a workpiece can positionally be estimated in a reliable manner, thus making it possible to precisely control actions of the robot arm in its operation.

Practically, the fourth axis (i.e., the fourth joints) is moved to angles $\theta_a$=0 degrees, $\theta_b$=90 degrees, and $\theta_c$=−90 degrees, respectively, which enables use of the formulas (9) and (10) to calculate the gravity center position $(x_{cog}, y_{cog})$ in an easier manner, which thus simplifies the calculation for the positional estimation. In addition, the fourth axis is moved with the third axis (joint) positionally fixed at the upper end position, with the result that, during arm movement to each of the first and second estimating positions, vibrations caused in the workpiece by the third axis can be suppressed. This suppression will lead to higher estimation precision in obtaining the gravity center position.

The present invention described above is not limited to the above-described embodiment, but can be developed to various other embodiments without departing from the spirit thereof.

For example, the angles $\theta_a$=0 degrees, $\theta_b$=90 degrees, and $\theta_c$=−90 degrees to each of which the fourth axis is moved not be limited to such relationships between the angle positions and the angles, but changed to other angular relationships. As another example, the angle amounts $\theta$ can be changed to other amounts described in the embodiment.

Further, the initial positions and estimating positions can also be changed to other positions.

Still further, the third axis (joint) cannot always be set at the upper end position if the robot is used in a condition that there is no or almost no influence of vibrations caused by the third axis. In such cases, the third axis, practically the shaft 8, can be lowered in the Z-axis direction during the estimation actions.

Still further, the execution order between the foregoing second and third steps can be interchanged to each other, and in the same manner, the execution order between the foregoing fifth and sixth steps can be interchanged to each other and the execution order of the foregoing eighth and ninth steps can also be exchanged with each other.

What is claimed is:

1. An apparatus for estimating a position of center of gravity of a load loaded to an industrial robot, the robot being provided with a robot arm driven horizontally, the robot arm including four axes configured as first to fourth axis and having an end effector to which the load is loaded, the apparatus comprising:
   a processor configured to perform, based on a program, a process for estimating the position of gravity of center of the load in a plane perpendicular to a height direction of a base included in the robot arm; and
   a storage device in which the program for the process is previously stored and is read by the processer for execution of the process,
   wherein the processor is further configured to:
      acquire a first acceleration which is generated at the second axis during accelerated and decelerated intervals of a first operation period in which the second axis is driven such that the robot arm moves from a first initial position to a first estimating position and returns from the first estimating position to the first initial position,
      wherein during the first operation period, the load having a mass m which is known, the fourth axis is positioned at a first angle $\theta_a$, and the first, third and fourth axes are the same in positions between the first initial and estimating positions;
      acquire a first acceleration torque which is generated at the fourth axis during the accelerated interval and a first deceleration torque which is generated at the fourth axis during the decelerated interval;
      calculate a first inertia $\tau_{I4a}$ which is generated around the fourth axis based on the first acceleration in both the accelerated and decelerated intervals, the first acceleration torque and the first deceleration torque;
      acquire a second acceleration which is generated at the second axis during accelerated and decelerated intervals of a second operation period in which the second axis is again driven such that the robot arm moves from a second initial position to a second estimating position and returns from the second estimating position to the second initial position,
      wherein during the second operation period, the load is given the same known mass, the fourth axis is positioned at a second angle $\theta_b$ ($\neq \theta_a$), and the first, third and fourth axes are the same in positions between the second initial and estimating positions;
      acquire a second acceleration torque which is generated at the fourth axis during the accelerated interval and a second deceleration torque which is generated at the fourth axis during the decelerated interval in the second operation period;

calculate a second inertia $\tau_{I4b}$ which is generated around the fourth axis based on the second acceleration in both the accelerated and decelerated intervals, the second acceleration torque and the second deceleration torque in the second operation period;

acquire a third acceleration which is generated at the second axis during accelerated and decelerated intervals of a third operation period in which the second axis is again driven such that the robot arm moves from a third initial position to a third estimating position and returns from the third estimating position to the third initial position, wherein during the third operation period, the load is given the same known mass, the fourth axis is positioned at a third angle $\theta_c$ ($\neq \theta_a, \theta_b$), and the first, third and fourth axes are the same in positions between the third initial and estimating positions;

acquire a third acceleration torque which is generated at the fourth axis during the accelerated interval and a third deceleration torque which is generated at the fourth axis during the decelerated interval in the third operation period;

calculate a third inertia $\tau_{I4c}$ which is generated around the fourth axis based on the third acceleration in both the accelerated and decelerated intervals, the third acceleration torque and the third deceleration torque in the third operation period; and calculate the position of center of gravity of the load in the plane, based on: i) amounts of the calculated inertia $\tau_{I4a}$, $\tau_{I4b}$ and $\tau_{I4c}$, which are acquired under the mutually-different first to third angles $\theta_c$, $\theta_a$, and $\theta_b$ of the fourth axis; and ii) the mass m of the load.

2. The apparatus of claim 1, wherein processor is further configured to set, as the first to third angles $\theta_c$, $\theta_a$, and $\theta_b$ of the fourth axis, 0 degrees, 90 degrees, and −90 degrees in a coordinate set for the end effector holding the load.

3. The apparatus of claim 1, wherein the base is provided at one end of the first arm via the first axis, a base coordinate being set to the base and having a height direction along a Z-axis direction thereof; and the processor is further configured to calculate the first to third acceleration and the first to third deceleration in a state where the third axis is driven to an uppermost position in the height direction.

4. The apparatus of claim 2, wherein the base is provided at one end of the first arm via the first axis, a base coordinate being set to the base and having the height direction along a Z-axis direction thereof; and the processor is further configured to calculate the first to third acceleration and the first to third deceleration in a state where the third axis is driven to an uppermost position in the height direction.

5. A method of estimating a position of center of gravity of a load loaded to an industrial robot, the robot being provided with a robot arm driven horizontally, wherein the robot arm includes a base, a first arm, a second arm, a shaft, an end effector, and four axes configured as a first axis, a second axis, a third axis, and a fourth axis, and wherein the first axis links the first arm to the base rotatably thereabout, the second axis links the second arm to the first arm rotatably thereabout, the shaft links the end effector to the second arm movably along a height direction of the base, and the end effector is loaded with the load, the method functionally realized by a processor, the method comprising:

acquiring a first acceleration which is generated at the second axis during accelerated and decelerated intervals of a first operation period in which the second axis is driven such that the robot arm moves from a first initial position to a first estimating position and returns from the first estimating position to the first initial position, wherein during the first operation period, the load having a mass m which is known, the fourth axis is positioned at a first angle $\theta_a$, and the first, third and fourth axes are the same in positions between the first initial and estimating positions;

acquiring a first acceleration torque which is generated at the fourth axis during the accelerated interval and first deceleration torque which is generated at the fourth axis during the decelerated interval;

calculating a first inertia $\tau_{I4a}$ which is generated around the fourth axis based on the first acceleration in both the accelerated and decelerated intervals, the first acceleration torque and the first deceleration torque;

acquiring a second acceleration which is generated at the second axis during accelerated and decelerated intervals of a second operation period in which the second axis is again driven such that the robot arm moves from a second initial position to a second estimating position and returns from the second estimating position to the second initial position, wherein during the second operation period, the load is given the same known mass, the fourth axis is positioned at a second angle $\theta_b$ ($\neq \theta_a$), and the first, third and fourth axes are the same in positions between the second initial and estimating positions;

acquiring a second acceleration torque which is generated at the fourth axis during the accelerated interval and a second deceleration torque which is generated at the fourth axis during the decelerated interval in the second operation period;

second calculating inertia $\tau_{I4b}$ which is generated around the fourth axis based on the second acceleration in both the accelerated and decelerated intervals, the second acceleration torque and the second deceleration torque in the second operation period;

acquiring a third acceleration which is generated at the second axis during accelerated and decelerated intervals of a third operation period in which the second axis is again driven such that the robot arm moves from a third initial position to a third estimating position and returns from the third estimating position to the third initial position, wherein during the third operation period, the load is given the same known mass, the fourth axis is positioned at a third angle $\theta_c$ ($\neq \theta_a, \theta_b$), and the first, third and fourth axes are the same in positions between the third initial and estimating positions;

acquiring a third acceleration torque which is generated at the fourth axis during the accelerated interval and a third deceleration torque which is generated at the fourth axis during the decelerated interval in the third operation period;

calculating a third inertia $\tau_{I4c}$ which is generated around the fourth axis based on the third acceleration in both the accelerated and decelerated intervals, the third acceleration torque and the third deceleration torque in the third operation period; and calculating the position of center of gravity of the load on a plane perpendicular to a height direction of the base, based on: i) amounts of the calculated inertia $\tau_{I4a}$, $\tau_{I4b}$ and $\tau_{I4c}$, which are acquired under the mutually-different first to third angles $\theta_c$, $\theta_a$, and $\theta_b$ of the fourth axis, and ii) the mass m of the load.

6. The method of claim 5, wherein the first to third acceleration acquiring steps set, as the first to third angles $\theta_c$, $\theta_a$, and $\theta_b$ of the fourth axis, 0 degrees, 90 degrees, and −90 degrees in a coordinate set for the end effector holding the load.

7. The method of claim 5, wherein the base is provided at one end of the first arm via the first axis, a base coordinate being set to the base and having the height direction along a Z-direction thereof, and
wherein the method further comprises calculating the first to third acceleration and the first to third deceleration with the third axis in a state where the third axis is driven to an uppermost position in the height direction.

8. The method of claim 6, wherein the base is provided at one end of the first arm via the first axis, a base coordinate being set to the base and having the height direction along a Z-direction thereof, and
wherein the method further comprises calculating the first to third acceleration and the first to third deceleration with the third axis in a state where the third axis is driven to an uppermost position in the height direction.

9. The apparatus of claim 1, wherein
the robot arm includes, in addition to the base and the end effector, a first arm, a second arm, and a shaft, and
the four axes are configured as a first axis, a second axis, a third axis, and a fourth axis, wherein the first axis links the first arm to the base rotatably thereabout, the second axis links the second arm to the first arm rotatably thereabout, the shaft links the end effector to the second arm movably along the height direction of the base.

10. An industrial robot system, comprising:
a robot arm driven horizontally, the robot arm including four axes configured as first, second, third and fourth axes and having an end effector to which a load is loaded;
a processor configured to perform a process based on a program; and
a storage device in which the program is previously stored and is read by the processor for execution of the process,
wherein the processor is further configured to:
acquire a first acceleration which is generated at the second axis during accelerated and decelerated intervals of a first operation period in which the second axis is driven such that the robot arm moves from a first initial position to a first estimating position and returns from the first estimating position to the first initial position,
wherein during the first operation period, the load having a mass m which is known, the fourth axis is positioned at a first angle $\theta_a$, and the first, third and fourth axes are the same in positions between the first initial and estimating positions;
acquire a first acceleration torque which is generated at the fourth axis during the accelerated interval and a second deceleration torque which is generated at the fourth axis during the decelerated interval;
calculate a first inertia $\tau_{I4a}$ which is generated around the fourth axis based on the first acceleration in both the accelerated and decelerated intervals, the first acceleration torque and the second deceleration torque;
acquire a second acceleration which is generated at the second axis during accelerated and decelerated intervals of a second operation period in which the second axis is again driven such that the robot arm moves from a second initial position to a second estimating position and returns from the second estimating position to the second initial position,
wherein during the second operation period, the load is given the same known mass, the fourth axis is positioned at a second angle $\theta_b$ ($\neq\theta_a$), and the first, third and fourth axes are the same in positions between the second initial and estimating positions;
acquire a second acceleration torque which is generated at the fourth axis during the accelerated interval and a second deceleration torque which is generated at the fourth axis during the decelerated interval in the second operation period;
calculate a second inertia $\tau_{I4b}$ which is generated around the fourth axis based on the second acceleration in both the accelerated and decelerated intervals, the second acceleration torque and the second decelerated torque in the second operation period;
acquire a third acceleration which is generated at the second axis during accelerated and decelerated intervals of a third operation period in which the second axis is again driven such that the robot arm moves from a third initial position to a third estimating position and returns from the third estimating position to the third initial position,
wherein during the third operation period, the load is given the same known mass, the fourth axis is positioned at a third angle $\theta_c$ ($\neq\theta_a$, $\theta_b$), and the first, third and fourth axes are the same in positions between the third initial and estimating positions;
acquire a third acceleration torque which is generated at the fourth axis during the accelerated interval and deceleration torque which is generated at the fourth axis during the decelerated interval in the third operation period;
calculate the third inertia $\tau_{I4c}$ which is generated around the fourth axis based on the third acceleration in both the accelerated and decelerated intervals, the third acceleration torque and the third deceleration torque in the third operation period; and
calculate a position of center of gravity of the load in a plane perpendicular to a height direction of a base included in the robot arm, based on: i) amounts of the calculated inertia $\tau_{I4a}$, $\tau_{I4b}$ and $\tau_{I4c}$, which are acquired under the mutually-different first to third angles $\theta_c$, $\theta_a$, and $\theta_b$ of the fourth axis; and ii) the mass m of the load.

11. The industrial robot system of claim 10, wherein
the robot arm, in addition to the base and the end effector, a first arm, a second arm, and a shaft, and
the four axes are configured as a first axis, a second axis, a third axis, and a fourth axis, wherein the first axis links the first arm to the base rotatably thereabout, the second axis links the second arm to the first arm rotatably thereabout, the shaft links the end effector to the second arm movably along the height direction of the base.

12. The industrial robot system of claim 11, wherein the processor is further configured to set, as the first to third angles $\theta_c$, $\theta_a$, and $\theta_b$ of the fourth axis, 0 degrees, 90 degrees, and −90 degrees in a coordinate set for the end effector holding the load.

13. The industrial robot system of claim 11, wherein the base is connected to one end of the first arm such that the first axis allows the first arm to be rotated about the first axis, a base coordinate being set to the base and having the height direction along a Z-axis direction thereof ; and the processor is further configured to calculate the first to third acceleration and the first to third deceleration in a state where the third axis is driven to an uppermost position in the height direction.

* * * * *